Figure 1:
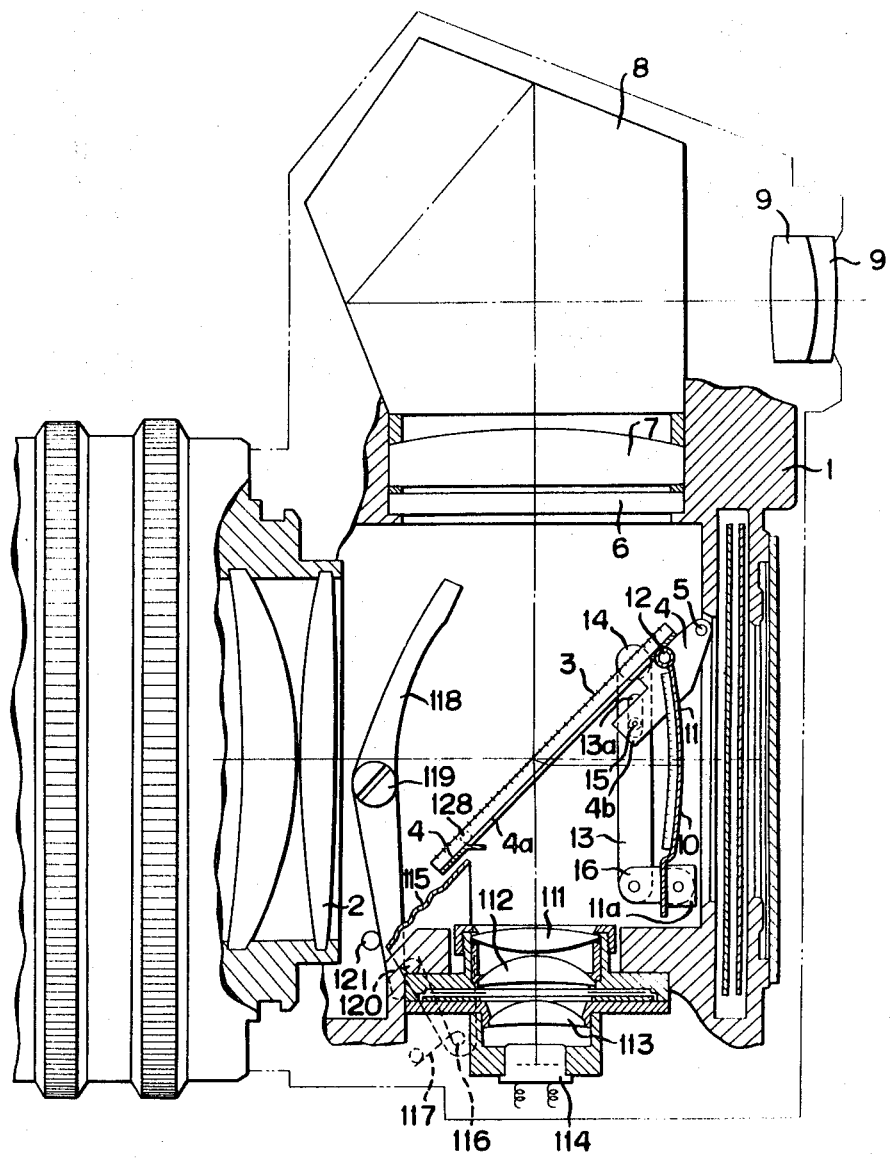

United States Patent

[11] 3,601,027

[72] Inventor Shigeo Ono
  Yokohama-shi, Japan
[21] Appl. No. 749,526
[22] Filed Aug. 1, 1968
[45] Patented Aug. 24, 1971
[73] Assignee Nippon Kogaku K.K.
  Tokyo, Japan
[32] Priority Aug. 11, 1967
[33] Japan
[31] 42/69265

[54] VIEWING MIRROR AND LIGHT SHIELD ARRANGEMENT FOR A SINGLE LENS REFLEX CAMERA
5 Claims, 2 Drawing Figs.

[52] U.S. Cl. .................................................. 95/42
[51] Int. Cl. .................................................. G03b 19/12
[50] Field of Search ........................................... 95/42, 10 C

[56] References Cited
UNITED STATES PATENTS

| | | | |
|---|---|---|---|
| 2,992,601 | 7/1961 | Heden | 95/42 |
| 3,020,815 | 2/1962 | Landbrech | 95/42 |
| 3,027,819 | 4/1962 | Reiche et al. | 95/42 |
| 3,332,331 | 7/1967 | Mandler | 95/42 |

Primary Examiner—Samuel S. Matthews
Assistant Examiner—Richard L. Moses
Attorney—Anton J. Wille ABSTRACT: An arrangement for the viewing mirror of a single lens reflex camera having a through-the-lens photometric system, is provided for effectively shielding the photocell from light rays entering the objective lens during viewing and exposure operations. A pivotable baffle plate is provided within the mirror compartment of the camera, which is pivoted between the two light shielding positions upon movement of the viewing mirror to its raised and lowered positions by the mirror mechanism of the camera. In addition to the viewing mirror, a concave mirror is disposed behind and pivoted to the viewing mirror to direct the image light rays back to the rear of the viewing mirror where they are then reflected onto the photocell surface. The pivotal connection between the concave mirror and the viewing mirror is such that a large aperture or window is provided for the viewing mirror so that a large bundle of image rays will pass through the semitransparent viewing mirror and be directed onto the surface of the photocell through a relay lens system. The concave mirror effectively seals the aperture or window in the viewing mirror when the mirrors are in their raised positions.

Patented Aug. 24, 1971 3,601,027

2 Sheets-Sheet 1

VIEWING MIRROR AND LIGHT SHIELD ARRANGEMENT FOR A SINGLE LENS REFLEX CAMERA

This invention relates to an arrangement for the viewing mirror of a single lens reflex camera having a through-the-lens photometric system.

In the present invention, a relay lens and a photosensitive element are provided within the camera body, the light rays of the object to be photometered and photographed being directed onto the surface of the photosensitive element through the relay lens system. With the viewing mirror in its lowered position the light rays entering through the objective lens mounted on the camera are in part reflected into the viewfinder optical system and in part pass through a semitransparent or partially transparent viewing mirror. A concave mirror behind the viewing mirror reflects the passed light rays back to the viewing mirror where they are reflected and directed into the relay lens to fall upon the photosensitive element or photocell. A baffle plate is provided for the relay lens system and photocell to block the light rays which may pass around the edges of the mirror when light measurements are made. When exposures are to be made, the viewing and concave mirrors are raised by the mirror mechanism of the camera, the viewing mirror cooperating with a pivoted lever to move the baffle plate over the relay lens system thereby preventing image rays from effecting the photocell during the exposure period.

In order to provide the largest possible bundle of image light rays for the photosensitive element, particularly in cases where the objective lens is of wide aperture, the viewing mirror should have a large opening or window for passing the image rays. When the concave mirror is pivoted on and movable with the viewing mirror, the pivotal connection between the two mirrors becomes a factor in limiting the area of the viewing mirror through which the image rays may pass. It has been found that the largest possible aperture for the viewing mirror may be obtained when the distance between the pivot shaft for the viewing mirror and the pivot shaft of the concave mirror are as close as possible.

An object of the present invention is to provide a mirror arrangement for a single lens reflex camera having a through-the-lens photometric system wherein the photocell of the photometric system is effectively sealed off from any light rays entering through the objective lens during viewing and exposure operations.

A further object of the invention is to provide a mirror arrangement of the characteristics indicated in which a light baffle is provided for the photocell which is interlocked with the viewing mirror and positionable thereby as the viewing mirror is moved to its raised and lowered positions.

A further object of the invention is to provide a mirror arrangement of the general characteristics indicated in which the aperture or window provided for the viewing mirror is made as large as possible by locating the pivot shafts of the viewing and concave mirrors as close together as possible.

Figure 2:
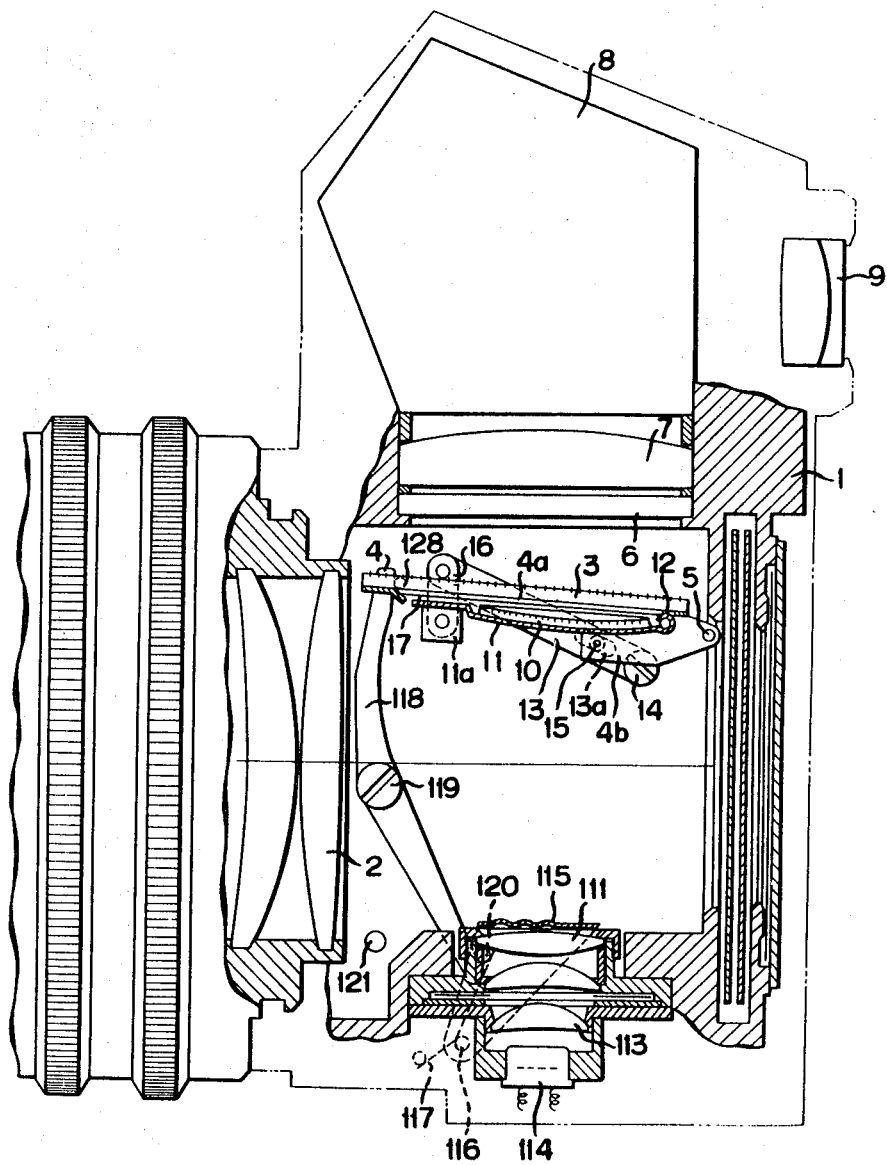

Above and other objects and advantages are apparent from the description referring to the illustrative embodiments shown in the drawing, in which:

FIG. 1 is a vertical cross sectional view of an embodiment of this invention, the reflecting or viewing mirror of the camera being in its lowered or viewing position; while FIG. 2 is a vertical cross-sectional view as in Fig. 1, the viewing mirror being in its raised or exposure position; a concave mirror and light baffle plate being moved out of the path of the image rays.

Referring now to FIG. 1, a portion of the mirror compartment of a single lens reflex camera body 1 is illustrated on which an objective lens 2 is mounted in the usual manner. Supported within the camera body 1 is a semitransparent or partially transparent viewing mirror 3 on a mirror supporting plate 4 is pivotally supported on a shaft 5 secured within the body 1. For purposes hereinafter appearing, the supporting plate 4 is formed with an opening or window 4a. Secured to the camera body in the usual manner above the mirror compartment is a viewing or focusing plate 6, a condenser lens 7 and a pentaprism 8. These elements together with eyepiece lenses 9, the viewing mirror 3 and the objective lens 2, form the viewfinder system for the single reflex camera.

A concave mirror 10 secured to a support plate 11 is disposed behind the viewing mirror, the support plate being pivotally supported by a shaft 12 secured to the mirror supporting plate 4. It will be noted that the shaft 12 is disposed quite close to the pivot shaft 5 so that a large opening 4a may be provided in the plate 4. It will also become apparent as the description proceeds, that the speed of movement of the concave mirror will be greater the distance is between the shafts 5 and 12.

The light rays entering through the objective lens 2 will strike the surface of the viewing mirror, a portion of the light rays being reflected into the eyepiece 9, the remainder of the rays passing through the window 4a and falling upon the surface of concave mirror 10. The light rays are reflected back toward the viewing mirror 3 where they are then reflected downwardly through a relay lens system comprising lenses 111, 112 and 113 onto the surface of photocell 114 forming a part of a built-in exposure meter system not otherwise illustrated.

The viewing mirror support plate 4 is driven by a conventional mirror driving mechanism of the camera to pivot a driving lever 13 pivoted at its upper end on a shaft 14. The driving lever 13 and the support plate 4 are interconnected through a pin and slot connection 13a, 15; the pin 15 being fixed in an extending arm 4b on support plate 4. The lever and the concave mirror plate 10 are interconnected by a link 16 pivoted at the lower end of the lever and pivoted on a tab 11a formed on the lower end of plate 11.

It will be apparent that the viewing mirror plate 4 and the concave mirror plate 11 can be interconnected by a spring disposed about the shaft 12 with its ends secured to the respective plates in place of the link 16.

A light shield means or baffle plate 115 is provided for the photocell and its optical system to prevent incident light rays on the photocell surface which may pass the lower end of the plate 4. The baffle plate 115 is pivoted on a shaft 116 in the camera body 1 and is biased in a counterclockwise direction by a spring 117 disposed about the shaft 116, the one end abutting a stop pin in the camera body and the other end abutting a pin 120 secured in the baffle plate. An interlocking lever 118 pivoted on a shaft 119 is pivoted counterclockwise through the abutment of the pin 120 on the baffle plate, a stop pin 121 being abutted by the lever 118 thereby holding the baffle plate 115 in the position illustrated in Fig. 1 to block the light rays from the objective lens.

When the viewing mirror is moved from its lowered or viewing positions to its raised or exposure position as illustrated in Fig. 2 by conventional means (not shown), the clockwise rotation of plate 4 will rotate the driving lever 13 pivoted on the camera body. The rotation of the lever 13 will raise the leading or lower edge of the concave mirror plate 11 through the link 16. With the interconnection between the lower ends of the lever 13 and mirror plate 11, the position of the pivot shaft 12 on the viewing mirror plate 4 can be made relative to the position of shaft 5 to provide for a large opening 4a in the viewing mirror plate.

The raised positions of the two mirrors may be limited by suitable stops or interconnections, a shock absorbing member 17 being provided on the plate 4 interposed between the two mirror plates in the latter case.

It will be apparent that the rotational velocity of the concave mirror frame 11 must be made greater than that of the viewing mirror in moving to the exposure position, so that both mirrors clear the image rays at approximately the same time to prevent any interference with the exposure operation. By suitable choice of the pivot points for the driving lever 13 (shaft 14) and support plate 4 (shaft 5) and the length of arm 4b carrying the pin 15 cooperating with the slot 13a in the driving lever, the angular velocity of the concave mirror plate can be made greater than the angular velocity of the viewing mirror plate.

As the viewing and concave mirrors are moved to their raised positions, the baffle plate 15 is pivoted clockwise about shaft 116 against the bias of the spring 117. A pin 128 is provided in the lower end of the supporting plate 4 which abuts the upper arm of the interlocking lever 118 to rotate the lever counterclockwise.

The lower end of the lever abutting the pin 120 on the baffle plate 115, will pivot the baffle plate clockwise to position the baffle plate in the position illustrated in Fig. 2. The photocell optical system is thus covered preventing any light from effecting the photocell during exposure, the concave mirror plate effectively sealing the mirror compartment and preventing any extraneous light from entering through the eyepiece.

After an exposure is made, the viewing mirror plate 4 is rotated counterclockwise by the mirror mechanism of the camera, thereby rotating the driving lever 13 in the same direction through the pin and slot connection. The driving lever will thus rotate the concave mirror plate counterclockwise to its lowered position as illustrated in Fig. 1. As the supporting plate 4 is lowered, the pin 128 abutting the upper end of the interlocking lever is moved downwardly thereby freeing the lever and permitting the bias of the spring 117 to return the baffle plate and the lever to the positions illustrated in Fig. 1.

There is thus provided a viewing mirror arrangement for a single lens reflex camera in which the various objects of the invention achieved and which meets with the conditions of practical use.

I claim:

1. A single lens reflex camera having an exposure meter comprising, in combination, a partially transparent viewing mirror pivotable between an operative viewing position wherein said mirror lies between an objective lens and a film and reflects a part of the light passing through the objective lens into a finder, and a nonoperative exposure position wherein said mirror is clear of the light path of said objective lens, means for pivoting said viewing mirror, a light-sensitive element positioned behind said partially transparent mirror to receive the light passing through said objective lens and said mirror, a pivotable light shield arranged to block any light rays passing around said viewing mirror, means for displacing said light shield means out of the light path from said objective lens to said film upon displacement of said viewing mirror from its operative position into its nonoperative position, and a lens system provided for the light-sensitive element interposed between the viewing mirror and the element, the displacement of said light shield means being to a position in which it covers the lens system provided for said light-sensitive element.

2. A single lens reflex camera according to claim 1, wherein said light-sensitive element is positioned at the bottom of a camera, a concave mirror for reflecting the light rays passing through said viewing mirror onto said element through said lens system, said concave mirror being pivotally mounted on said viewing mirror, and means interconnecting said two mirrors for moving said concave mirror with said viewing mirror.

3. A single lens reflex camera according to claim 1, wherein the means for displacing said light shield means includes an interlocking lever pivoted intermediate its ends on the camera body, one arm of said lever being in the path of movement of said viewing mirror, said light shield means being pivotable between the first position where it is out of the light path from said objective and the second position where it covers said lens system, and resilient means for biasing said light shield means to said first position where it abuts the other arm of the interlocking lever, movement of the viewing mirror toward its nonoperative position pivoting the interlocking lever to pivot said light shield means against the bias of said resilient means to its second position.

4. A single lens reflex camera according to claim 2, wherein said means interconnecting the viewing and concave mirrors includes a driving lever pivoted at its upper end to the camera body, a pin and slot connection between the driving lever and the viewing mirror, and a link interconnecting the lower ends of the driving lever and the concave mirror.

5. A single lens reflex camera having an exposure meter comprising, in combination, a partially transparent viewing mirror pivotable between an operative viewing position where said mirror lies between the objective lens and the film and reflects part of the light passing through said objective lens into the viewfinder, and a nonoperative exposure position wherein said mirror is clear of the light path of said objective lens, a light-sensitive element positioned at the bottom of a camera to receive the light passing through said objective lens and said mirror, a concave mirror mounted on said viewing mirror to be pivotable between an operative position wherein said concave mirror reflects the light passing through said viewing mirror onto said light-sensitive element and a nonoperative position wherein said concave mirror is clear of the light path of said objective lens and blocks the light from said viewfinder, means interconnecting said mirrors, including a lever pivotally mounted on the camera and connected by a pin and slot connection to said viewing mirror and by a link connecting said lever and said concave mirror so that the concave mirror is displaced to its nonoperative position upon displacement of said viewing mirror to its nonoperative position.